United States Patent [19]

Wu et al.

[11] Patent Number: 5,704,052
[45] Date of Patent: Dec. 30, 1997

[54] BIT PROCESSING UNIT FOR PERFORMING COMPLEX LOGICAL OPERATIONS WITHIN A SINGLE CLOCK CYCLE

[75] Inventors: Gary C. Wu, Wayne; Chandra S. Pawar, Harleysville; Steven H. Leibowitz, Norristown; Edward J. Pullin, West Chester; Michael J. Hazzard, Downingtown; Joseph C. Duggan, Glenside, all of Pa.

[73] Assignee: Unisys Corporation, Blue Bell, Pa.

[21] Appl. No.: 635,541

[22] Filed: Apr. 22, 1996

Related U.S. Application Data

[63] Continuation of Ser. No. 352,092, Nov. 6, 1994, abandoned.

[51] Int. Cl.$^6$ ........................................................... G06F 7/52
[52] U.S. Cl. ................................................. 395/380; 395/565
[58] Field of Search ................................................ 395/380, 565

[56] References Cited

U.S. PATENT DOCUMENTS

| | | | |
|---|---|---|---|
| 3,982,229 | 9/1976 | Rouse et al. | 395/775 |
| 4,085,447 | 4/1978 | Pertl et al. | 395/375 |
| 4,139,899 | 2/1979 | Tulpule et al. | 395/375 |
| 4,467,444 | 8/1984 | Harmon et al. | 395/375 |
| 4,569,016 | 2/1986 | Hao et al. | 395/375 |
| 4,903,228 | 2/1990 | Gregoire et al. | 395/375 |
| 5,005,118 | 4/1991 | Lenoski | 395/375 |
| 5,123,108 | 6/1992 | Olson et al. | 395/800 |
| 5,175,863 | 12/1992 | Jones, Jr. | 395/800 |
| 5,177,679 | 1/1993 | Baxter | 395/800 |
| 5,197,135 | 3/1993 | Eickemeyer et al. | 395/375 |
| 5,197,138 | 3/1993 | Hobbs et al. | 395/375 |
| 5,201,056 | 4/1993 | Daniel et al. | 395/800 |
| 5,210,835 | 5/1993 | Sakamura et al. | 395/375 |
| 5,287,532 | 2/1994 | Hunt | 395/800 |

OTHER PUBLICATIONS

G.B. Steven, et al., "HARP: A Parallel Pipelined RISC Processor," *Microprocessors and Microsystems*, vol. 13, No. 9, Nov. 1989, pp. 579–587.

R.G. Adams, et al., "Utilising Low Level Parallelism in General Purpose Code: The HARP Project," *Microprocessing and Microprogramming*, vol. 29, No. 3, Oct. 1990, pp. 137–149.

*Primary Examiner*—Krisna Lim
*Attorney, Agent, or Firm*—John B. Sowell, Esq.; Mark T. Starr, Esq.; John F. O'Rourke, Esq.

[57] ABSTRACT

A microprocessor architecture that includes an arithmetic logic unit (ALU), a bit processing unit (BPU), a register file and an instruction register is disclosed. The BPU performs complex logical operations in a single clock cycle. The ALU continues to perform the slow arithmetic operations (e.g., multiply, divide). The BPU has two special purpose registers, a zero flag and a match flag, which are used for program execution control. The BPU performs bit manipulations on data stored in and received from the register file and/or individual fields in the instruction currently being executed by the BPU.

41 Claims, 10 Drawing Sheets

BIT PROCESSING UNIT FOR PERFORMING COMPLEX LOGICAL OPERATIONS WITHIN A SINGLE CLOCK CYCLE

This application is a continuation of application Ser. No. 08/352,092, filed Nov. 30 1994, now abandoned.

BACKGROUND OF THE INVENTION

1. Field of the Invention

The present invention relates generally to the field of computer architecture and, more particularly, to a data execution unit for manipulating bit fields of a data word in a processor environment.

2. Discussion of Related Art

The computer is divided into a plurality of basic components. The Central Processing Unit (CPU) or processor is the core of the computer and contains primary portions of the computer except the memory, input and output. At a high level, a processor can be though of as including two components: computation and control.

A processor typically includes an arithmetic logic unit (ALU), instruction register, and a register file. The ALU performs standard arithmetic operations such as addition and subtraction. Additionally, the ALU handles logical operations such as AND, OR, NOT and XOR. Instruction by instruction, the ALU performs one of these operations under control of signals from the instruction register. The instruction register holds a plurality of instructions before execution.

The register file contains a set of general-purpose registers that can be used to store variables. Storing variables in a register file reduces memory traffic and speeds up execution of instructions (since access to registers is faster than to memory).

A conventional ALU requires one or more clock cycles to perform an arithmetic operation and one or more clock cycles for a logical operation. Arithmetic operations are much slower than logical operations due to long carry-out functions performed for arithmetic operations. Oftentimes, logical operations are stalled while arithmetic operations, that appear earlier in the instruction queue, complete their execution. Additionally, the longer datapath required for arithmetic operations oftentimes slows the execution of logical operations.

SUMMARY OF THE INVENTION

A microprocessor architecture that includes an arithmetic logic unit (ALU), a bit processing unit (BPU), a register file and an instruction register is disclosed. The BPU performs complex logical operations in a single clock cycle. The ALU continues to perform slow arithmetic operations (e.g., multiply, divide, etc.). The BPU has two special purpose registers, a zero flag register and a match flag register, which are used for program execution control. The BPU performs bit manipulations on data stored in, and received from the register file and/or individual fields of the instruction currently being executed by the BPU.

The BPU includes a shift functional unit, a shift/rotate functional unit, and a merge functional unit. The merge function unit includes digital logic (e.g., AND gates, OR gates, inverters, etc.) for performing a variety of Boolean operations. The BPU also includes a plurality of multiplexers for selecting data from the shift functional unit, the shift/rotate functional unit and the merge functional unit. In a preferred embodiment, the BPU is implemented to perform the following operations: (1) shift and rotate; (2) clear bit field; (3) isolate bit field; (4) extract bit field; (5) load bit field; (6) compare bit field; and (7) load literal field. Each of these operations is performed in a single clock cycle utilizing the same set of logic gates that include the shift functional unit, the shift/rotate functional unit, and the merge functional unit.

The BPU also has two special purpose flags: a BPU__Match__Flag and a BPU__Equal__Zero flag. The BPU__Match__Flag is updated only by a compare bit operation. The BPU__Equal__Zero flag is set when the current BPU operation result is equal to zero, and reset otherwise. It covers the entire width of the result word (as opposed to individual bits of the result word) and is updated on every BPU operation. The match flag 260 and the zero flag 270 can be used for program execution control (e.g., to branch to location XX if match flag is set).

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

The preferred embodiment of the invention is discussed in detail below. While specific part numbers and/or configurations are discussed, it should be understood that this is done for illustration purposes only. A person skilled in the relevant art will recognize that other components and configurations can be used without parting from the spirit and scope of the invention.

The preferred embodiment of the invention is now described with reference to the figures where like reference numbers indicate like elements. Also in the figures, the digit(s) to the left of the two right-most digits identify the figure in which the reference number is first used.

Figure 1:
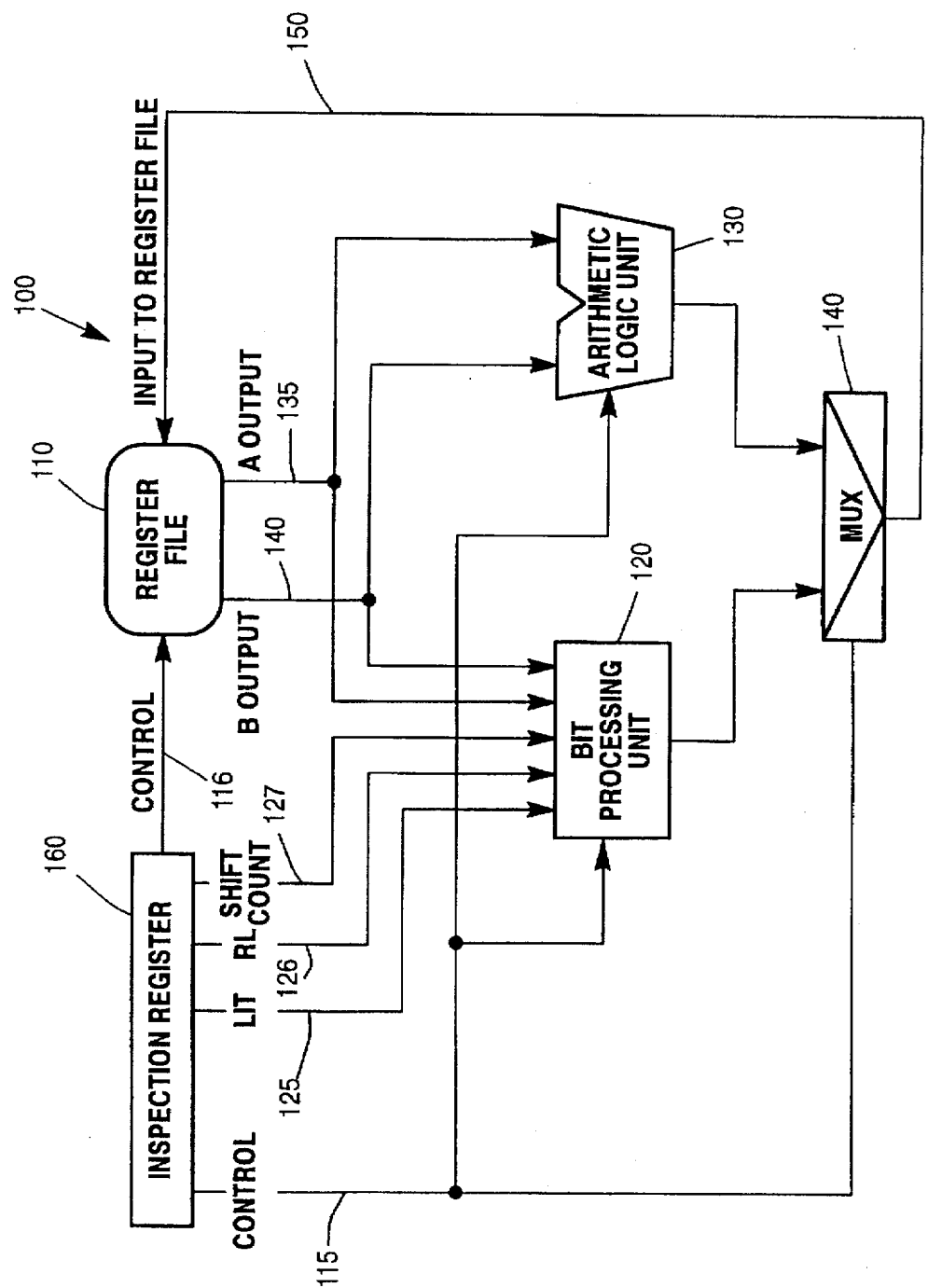
FIG. 1 illustrates a high level architectural block diagram of a processor 100 that includes a Bit Processing Unit 120 according to the present invention.

FIG. 1 illustrates a high level architectural block diagram of a processor 100, constructed in accordance with the present invention. That is, FIG. 1 illustrates an environment for the present invention. Processor 100 includes a register file 110, an instruction register 160, a Bit Processing Unit (BPU) 120, and Arithmetic Logic Unit (ALU) 130. Processor 100 differs from conventional processor architectures in that it includes BPU 120. BPU 120 is adapted to execute complex logical operations in a single clock cycle by eliminating slow arithmetic operations and concentrating only on logical operations. Using BPU 120 as an alternative execution unit for non-arithmetic operations greatly enhances the performance of the processor.

In particular, FIG. 1 shows the relationship between ALU 130 and BPU 120. Register file 110 has an A output 135, a B output 140 and an input 150. Both the A output 135 and the B output 140 are connected to ALU 130 and BPU 120. Input and Output from register file 110 is controlled via one or more lines of control bus 116. In one embodiment, information on control bus 116 is generated based on the instruction currently being executed. This information can be generated during a decoding step or immediately prior to execution. As would be apparent to a person skilled in the relevant art, information on control bus 116 can be generated at other times.

Note that the term "line" and "bus" are used interchangeably throughout this document. Thus, a line or bus may transfer a single bit of information or multiple bits of information depending on the specific context in which the line or bus is used (i.e., the specific designation used is not dispositive of the number of bits transferred).

The outputs of BPU 120 and ALU 130 are connected to multiplexer 140. One or more lines of a control bus 115 are used to control the multiplexer 140 for forwarding results from BPU 120 and ALU 130 to the register file 110. Control bus 115 also acts as an input to BPU 120 and ALU 130. Although only a single bus 115 is shown in FIG. 1, other control information may be used to control BPU 120, ALU 130 and multiplexer 140 as would be apparent to a person skilled in the relevant art.

BPU has three additional inputs originating from the instruction register 160. These inputs are based on three fields found in instructions stored in the instruction register 160: a LIT field 125, a RL field 126 and SHIFT COUNT field 127. LIT field 125 represents a literal field in an instruction. The literal field is 18 bits in length. RL field 126 is a single control bit within the instruction. The SHIFT COUNT field 127 represents a zero to six bit field in the instruction. These three fields are used by BPU 120 to perform a number of logical operations, as described below.

Figure 2:
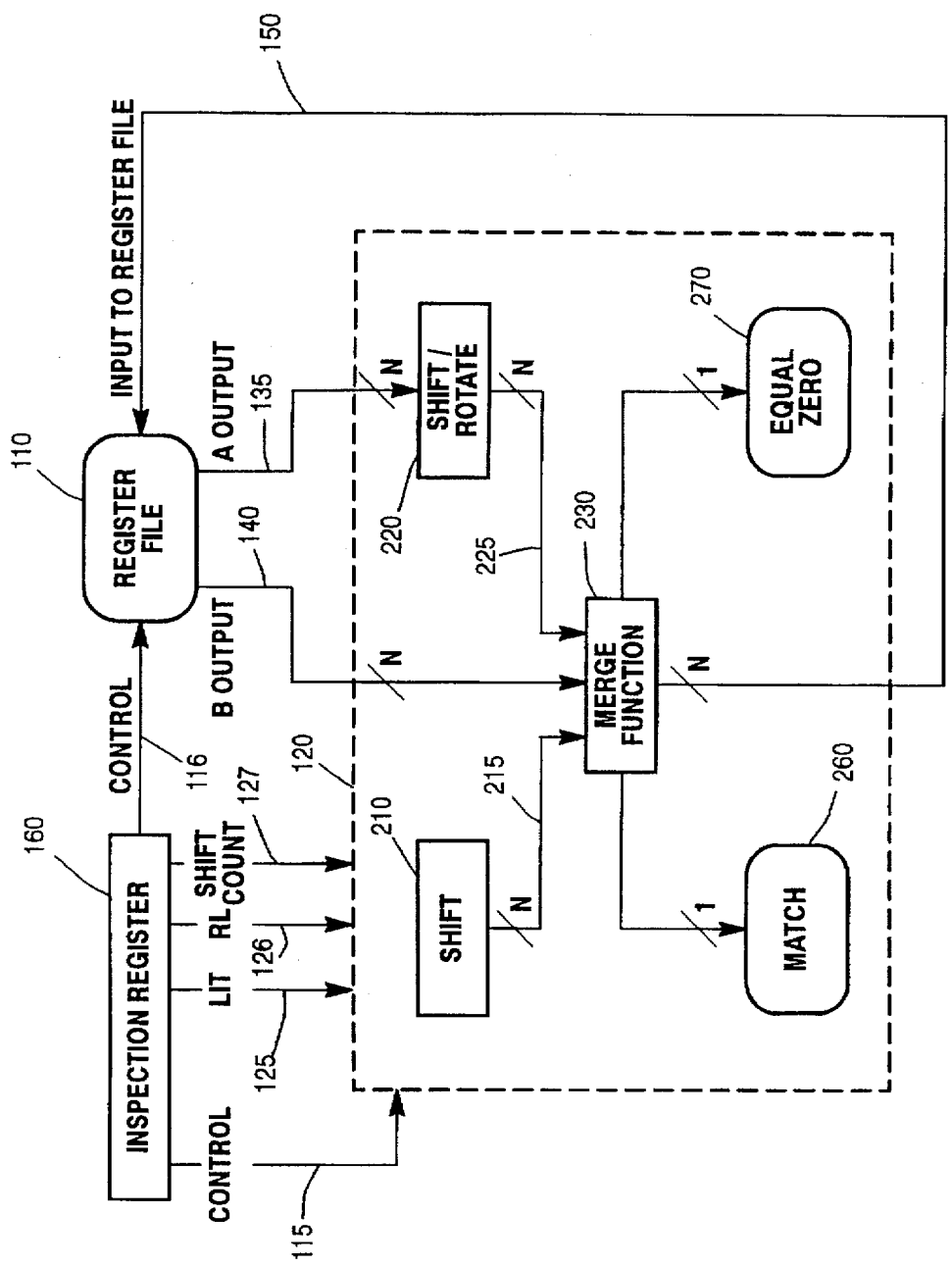
FIG. 2 shows a detailed block diagram of the Bit Processing Unit 120 according to the present invention.

FIG. 2 shows a detailed block diagram of BPU 120. In a preferred embodiment, the BPU 120 supports register sizes of 48, 36 and 32 bits. However, implementation of other register sizes is contemplated by the present invention as would be apparent to a person skilled in the relevant art. A register size of 48 is used for the remainder of this discussion to describe the operation of BPU 120.

BPU 120 includes a shift functional unit 210, a shift/rotate functional unit 220, and a merge function unit 230. The merge function unit 230 includes digital logic (e.g., AND gates, OR gates, inverters, etc.) for performing a variety of boolean operations. BPU 120 also includes a plurality of multiplexers for selecting data from the shift functional unit 210, the shift/rotate functional unit 220 and the merge function unit 230. The digital logic and mutliplexers will be described in more detail below with reference to the specific operations of BPU 120.

BPU 120 also has two special purpose flags: a BPU__ Match__Flag 260 (hereinafter match flag 260) and a BPU__ Equal__Zero flag 270 (hereinafter zero flag 270). The match flag 260 is updated only by a compare bit operation (described below). The zero flag 270 is set when the current BPU operation result is equal to zero, and reset otherwise. It covers the entire width of the result word (as opposed to individual bits of the result word) and is updated on every BPU operation. The match flag 260 and the zero flag 270 can be used for program execution control (e.g., branch to location XX if match flag is set).

In a preferred embodiment, BPU 120 is implemented to perform the following operations: (1) shift and rotate; (2) clear bit field; (3) isolate bit field; (4) extract bit field; (5) load bit field; (6) compare bit field; and (7) load literal field. However, implementation of other functions is contemplated by the present invention as would be apparent to a person skilled in the relevant art. These seven operations are discussed below with reference to a 48-bit word. However, the present invention contemplates any size word.

Figure 3:
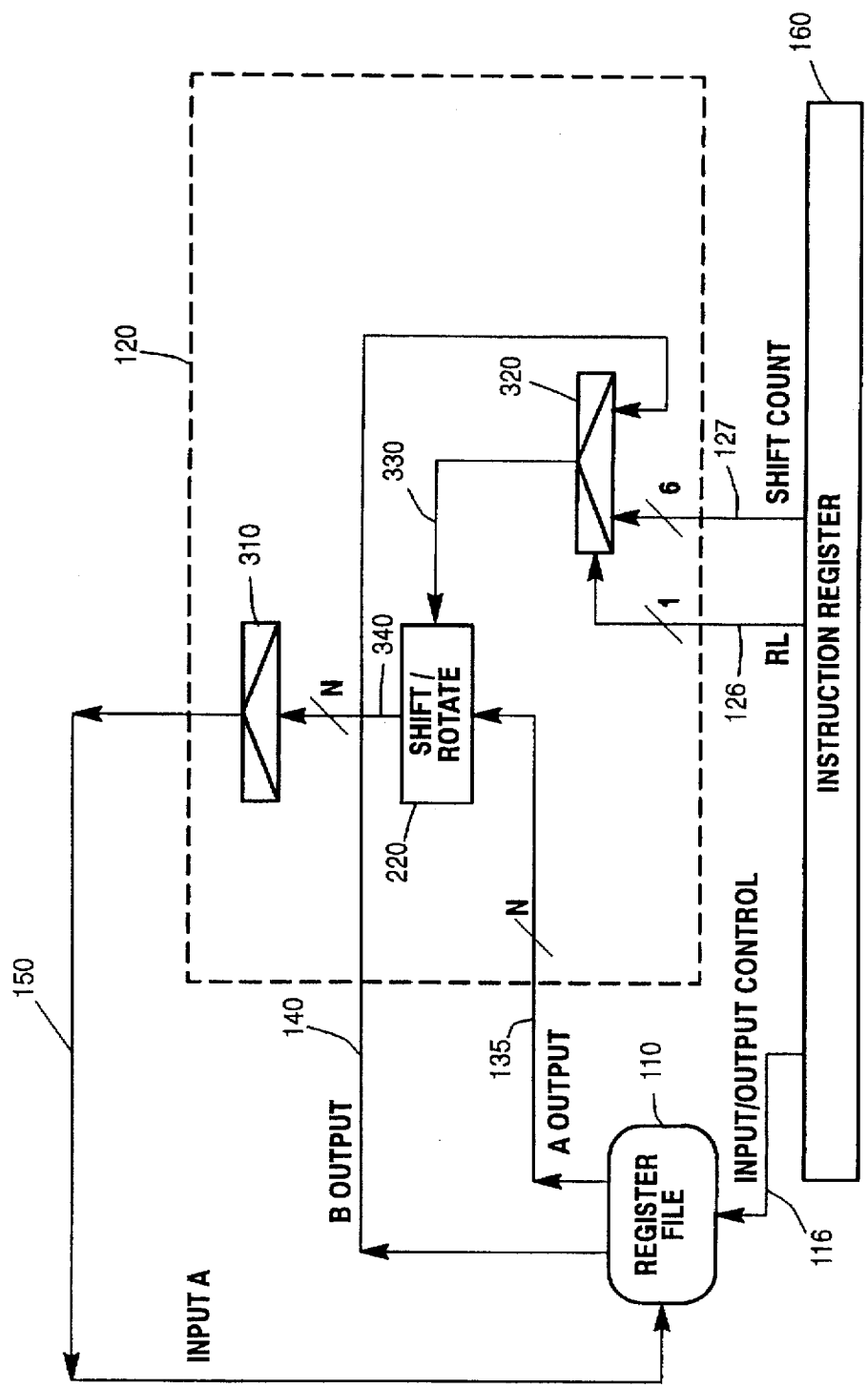
FIG. 3 is a detailed block diagram of the logic used to implement a shift and rotate operation.

FIG. 3 shows exemplary logic required to perform the function of a shift and rotate. The logic to perform the shift and rotate function includes multiplexers 310 and 320 and a shift/rotate functional unit 220. This function shifts or rotates an input word X number of bit positions toward the most significant bit (MSB). In this context, X is a number from 0 to (N−1) and N is the word size (e.g., 48 bits). If the operation specified is a shift, either 0's or 1's can be specified as the shift input into the least significant bit. This information is typically specified by the instruction (i.e., it is encoded in the instruction word). If the operation specified is a rotate, the shift output from the MSB is used as a shift input to the LSB. Bit position of the MSB depends on the word size.

The input data word (i.e., X) used by this operation is from the A output 135 of the register file 110.

The number of bit positions shifted or rotated can be specified in at least two different manners. First, it can be a 6-bit number specified directly in the instruction word. This is specified in the SHIFT COUNT field 127. Second, the number of bit positions shifted or rotated can be specified by a 6-bit number from a second register, e.g., the B output 140 of the register file 110. The control bit RL 126 specifies whether the SHIFT COUNT field 127 or the B output 135 is to be used.

Both output ports of the register file 110 will be used if a shift or rotate instruction chooses to use a 6-bit number from the B output 140 to supply the number of bit positions to be shifted/rotated. Only the least significant bits from the register are used in this case. The rest of the bits from the B output 140 are ignored.

Figure 4:
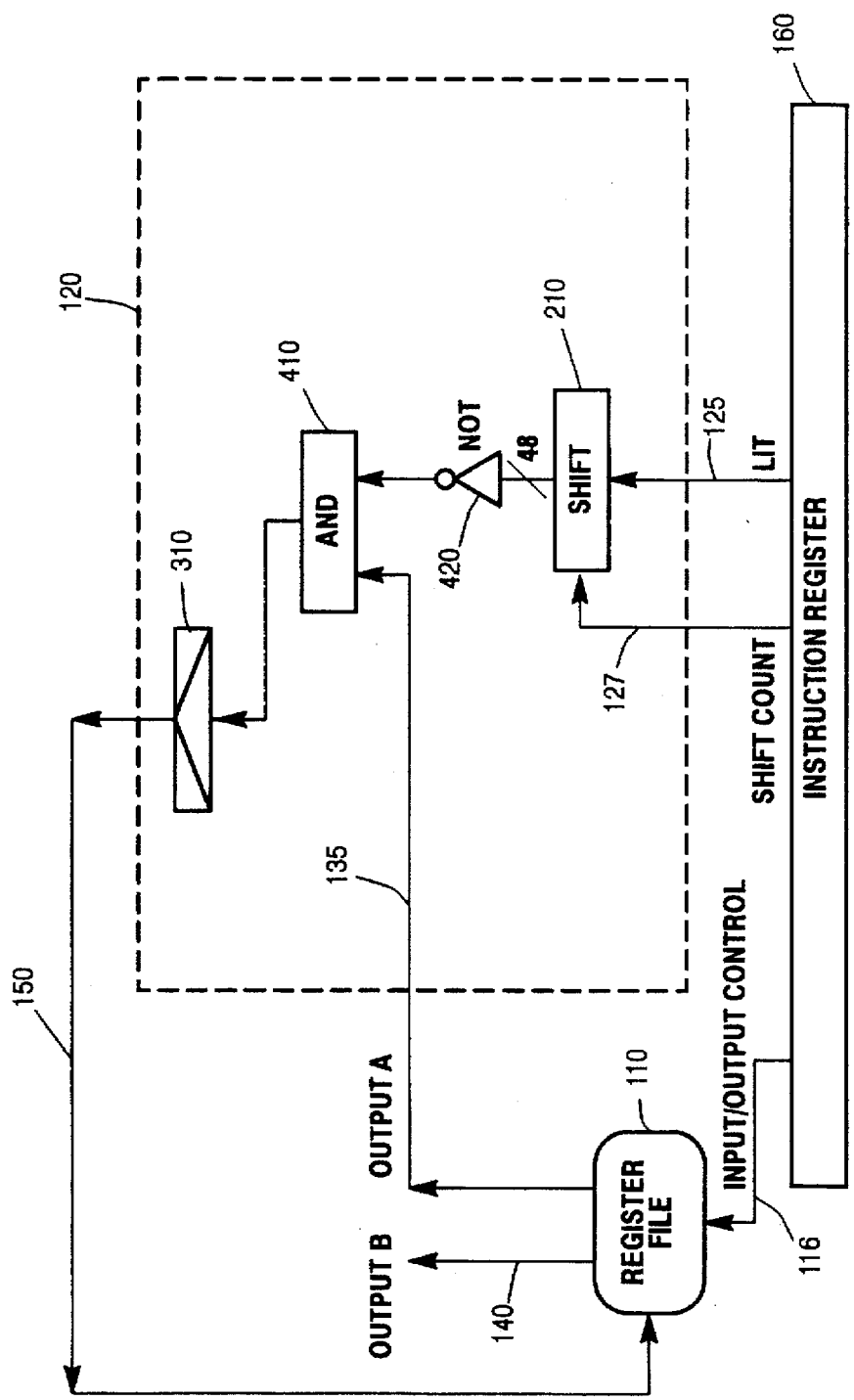
FIG. 4 is a detailed block diagram of the logic used to implement a clear bit-field operation.

FIG. 4 shows exemplary logic to perform the function of a clear bit-field. The logic to perform the clear bit-field function includes the shift functional unit 210, an AND gate 410, a NOT gate 420, and multiplexer 310. This is a single-operand operation which resets bits [X: Y] to zero and leaves all other bits of the input word intact. In this context, X is a number from 0 to (N−1), where N is the word size selected. Y is a number from 1 to 18.

LIT 125 is an 18-bit value from the current instruction with the high order bits padded with zeroes. LIT 125 is equal to Y. The SHIFT COUNT 127 indicates how many bits LIT 125 should be shifted by shift functional unit 210. Shift functional unit 210 produces a 48-bit word having Y ones starting at bit X. This 48-bit word is input to NOT gate 420. The resulting 48-bit word having Y zeros starting at bit X. This 48-bit word is input to AND gate 410.

The 48-bit input data word for this operation is from the A output 135 of the register file 110. The input data word from the A output 135 in ANDed with the 48-bit word output from NOT gate 420. The resulting 48-bit word has bits [X:Y] reset to zero while the other bits of the input data word remain intact.

The resulting data word is input to multiplexer 310. This data word is then selected from multiplexer 310 and stored in the register file 110 via data line 150. Multiplexer 310 is controlled via a set of control lines (not shown) that are generated based on the currently executing instruction word. Generation of this set of control lines should be readily apparent to one skilled in the relevant art.

Figure 5:
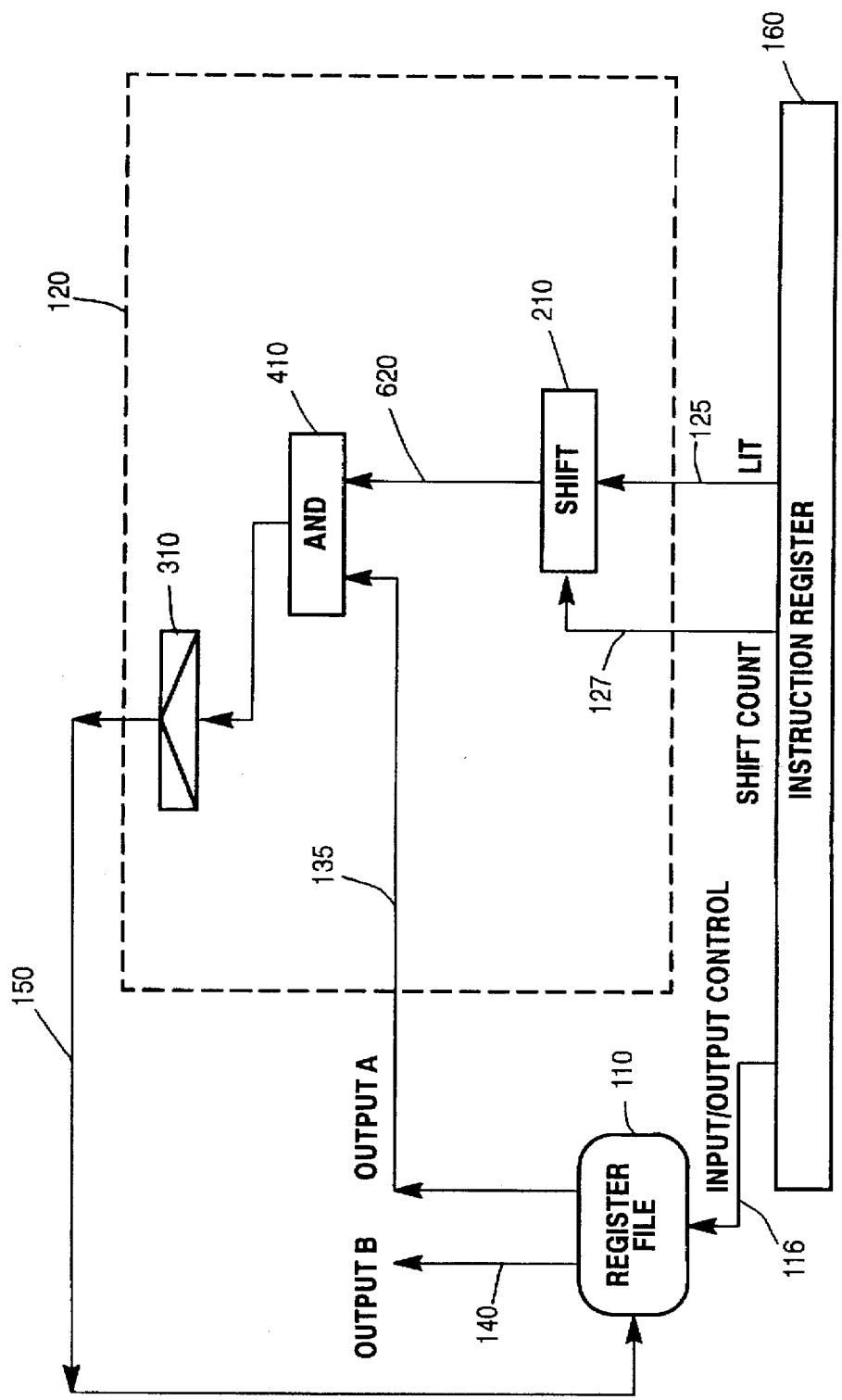
FIG. 5 is a detailed block diagram of the logic used to implement an isolate bit-field operation.

FIG. 5 shows exemplary logic to perform the function of an isolate bit-field. The logic used to perform the isolate bit-field function includes the shift functional unit 210, AND gate 410 and multiplexer 310. This is a single-operand operation which resets to zero all bits of an input word except bits [X:Y]. In this context, X is a number from 0 to (N–1), where N is the word size selected. Y is a number from 1 to 18. In a 48-bit mode, tag bits are carried from input to output unmodified.

LIT 125 is an 18-bit value from the current instruction with the high order bits padded with zeroes. LIT 125 is equal to Y. The SHIFT COUNT 127 indicates how many bits LIT 125 should be shifted by shift functional unit 210. Shift functional unit 210 produces a 48-bit word having Y ones starting at bit X. This 48-bit word is input to AND gate 410.

The 48-bit input data word for this operation is from the A output 135 of the register file 110. The input data word from the A output 135 is ANDed with the 48-bit word output from shift functional unit 210. The resulting 48-bit word has all bits reset to zero except bits [X:Y].

The resulting data word is input to multiplexer 310. This data word is then selected from multiplexer 310 and stored in the register file 110 via data line 150.

Figure 6:
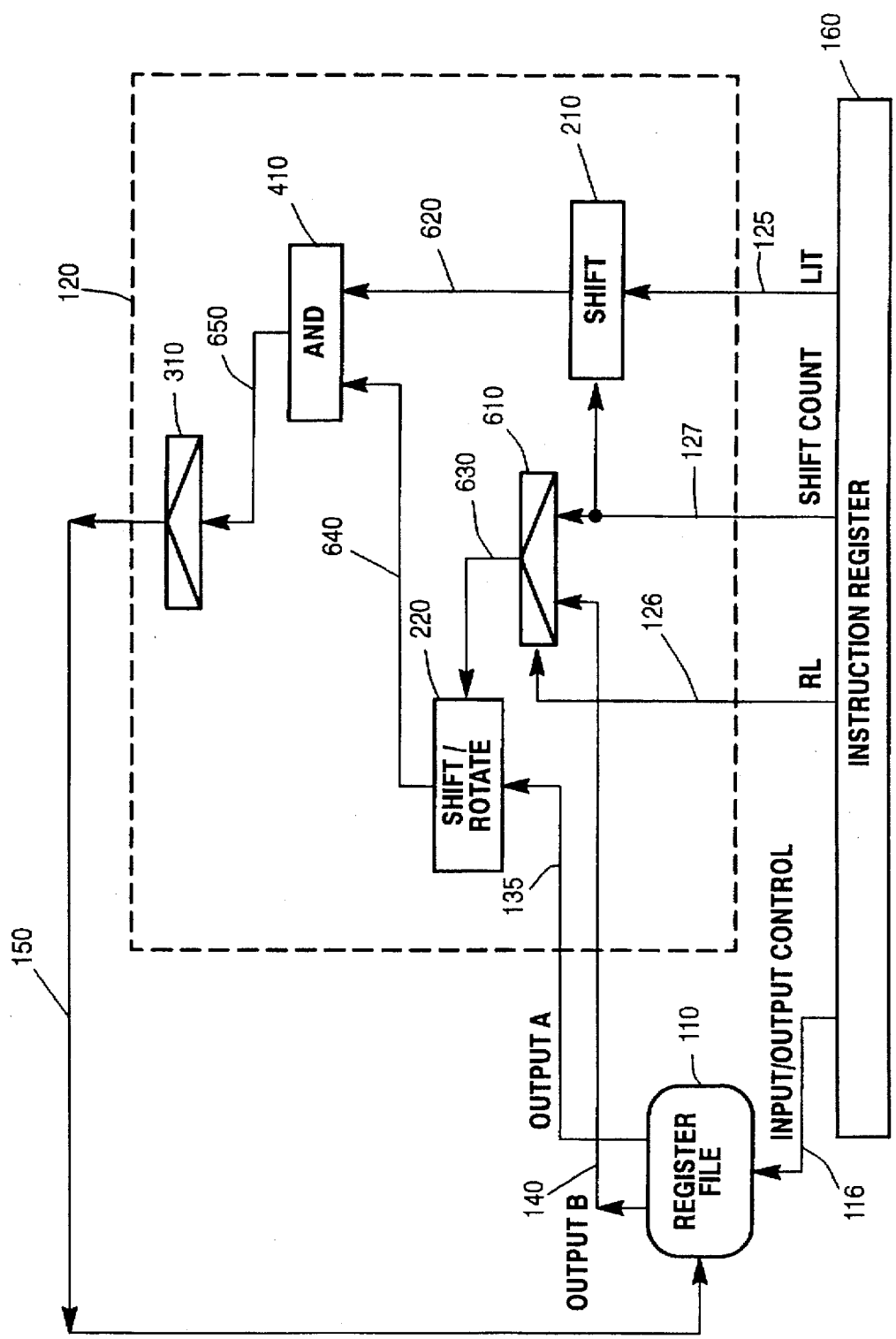
FIG. 6 is a detailed block diagram of the logic used to implement an extract bit-field operation.

FIG. 6 shows exemplary logic to perform the function of an extract bit-field. The logic to perform the extract bit-field function includes shift functional unit 210, shift/rotate functional unit 220, AND gate 410, and multiplexers 610 and 310. This is a single-operand operation that moves bits [X:Y] of an input word down [(Y–1):Y] and resets the rest of the bits to zero. In this context, X is a number from 0 to (N–1), where N is the word size selected. Y is a number from 1 to 18.

The 48-bit input data word for this operation is from the A output 135 of the register file 110. The data word from the A output 135 is input to shift/rotate functional unit 220. The shift/rotate functional unit 220 rotates the input word so that bit X becomes bit (Y–1). The shift output from the MSB is used as the shift input to the LSB.

The number of bit positions rotated can be specified in at least two different manners. First, it can be a 6-bit number specified directly in the instruction word stored in instruction register 160. This is specified in the SHIFT COUNT field 127. Second, the number of bit positions shifted or rotated can be specified by a 6-bit number from a second register, e.g., the B output 140 of the register file 110. Note that only the least significant bits from the B output 140 of register file 110 are used as an input to shift/register functional unit 220. The rest of the bits from the B output 140 are ignored.

The control bit RL 126 specifies whether the SHIFT COUNT field 127 or the B output 135 is to be used. Both the SHIFT COUNT field 127 and the B output 140 are input to multiplexer 610. Based on the value of the RL field 126, one of these two inputs is selected from multiplexer 610 and used as an input to shift/rotate functional unit 220 via line 630. The 48-bit word produced by shift/rotate functional unit 220 is input to AND gate 410 via line 640.

LIT 125 is an 18-bit value from the current instruction with the high order bits padded with zeroes. LIT 125 is equal to Y. The SHIFT COUNT 127 indicates how many bits LIT 125 should be shifted by shift functional unit 210. Shift functional unit 210 produces a 48-bit word having Y ones starting at bit X. This 48-bit word is input to AND gate 410 via line 620.

The 48-bit word on line 620 is ANDed with the 48-bit word on line 640. The resulting 48-bit data word is input to multiplexer 310 via line 650. This data word is then selected from multiplexer 310 and stored in the register file 110 via data line 150.

Figure 7:
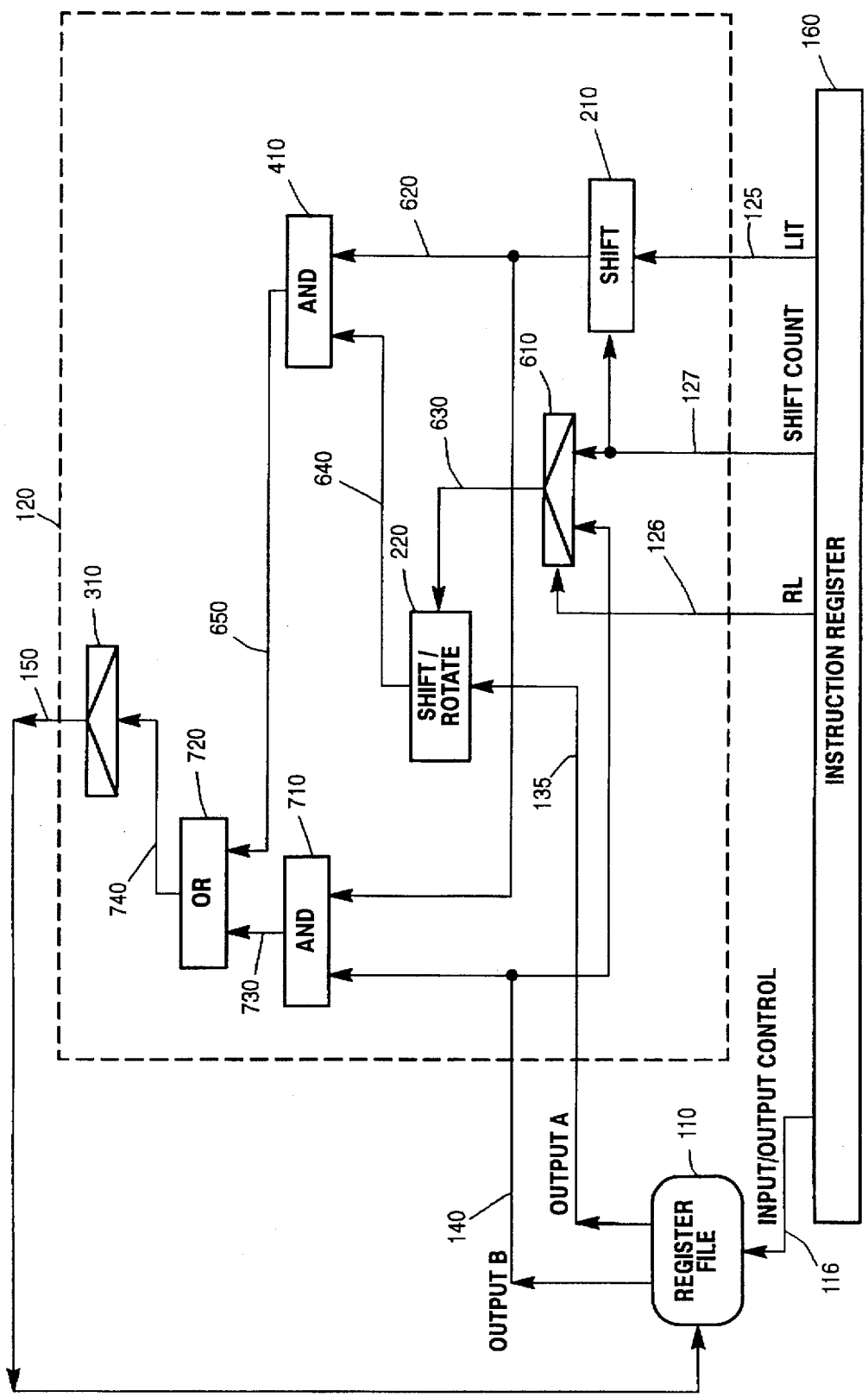
FIG. 7 is a detailed block diagram of the logic used to implement a load bit-field operation.

FIG. 7 shows exemplary logic to perform the function of a load bit-field. The logic includes shift functional unit 210, shift/rotate functional unit 220, AND gates 410 and 710, OR gate 720 and multiplexers 610 and 310. The load bit-field is a two-operand operation that performs the reverse of the extract bit-field function described above. It replaces bits [X:Y] of a first input word with the contents of bit field [(Y–1):Y] of the second input word. The other bits of the resulting word are copied directly from the first input word. In this context, X is a number from 0 to (N–1), where N is the word size selected. Y is a number from 1 to 18. In a 48-bit mode, tag bits are carried from input to output unmodified.

The first 48-bit input word for this operation is from the A output 135 of the register file 110. The data word from the A output 135 is input to shift/rotate functional unit 220. The shift/rotate functional unit 220 rotates the input word so that bit X becomes bit (Y–1). The shift output from the MSB is used as the shift input to the LSB.

The number of bit positions rotated can once again be specified in at least two different manners. First, it can be a 6-bit number specified directly in the instruction word stored in instruction register 160. This is specified in the SHIFT COUNT field 127. Second, the number of bit positions shifted or rotated can be specified by a 6-bit number from a second register, e.g., the B output 140 of the register file 110. Note that only the least significant bits from the B output 140 of register file 110 are used as an input to shift/register functional unit 220. The rest of the bits from the B output 140 are ignored.

The control bit RL 126 specifies whether the SHIFT COUNT field 127 or the B output 135 is to be used. Both the SHIFT COUNT field 127 and the B output 140 are input to multiplexer 610. Based on the value of the RL field 126, one of these two inputs are selected from multiplexer 610 and used as an input to shift/rotate functional unit 220 via line 630. The 48-bit word produced by shift/rotate functional unit 220 is input to AND gate 410 via line 640.

LIT 125 is an 18-bit value from the current instruction with the high order bits padded with zeroes. LIT 125 is equal to Y. The SHIFT COUNT 127 indicates how many bits LIT 125 should be shifted by shift functional unit 210. Shift functional unit 210 produces a 48-bit word having Y ones starting at bit X. This 48-bit word is input to AND gate 410 and AND gate 710 via line 620.

The 48-bit word on line 620 is ANDed with the 48-bit word on line 640. The resulting 48-bit data word is input to OR gate 720 via line 650. The 48-bit word on line 620 is also ANDed with the B output 140 of register file 110. The outputs of AND gate 410 and AND gate 710 are input to OR gate 720 via line 650 and line 730, respectively.

The 48-bit word on line 650 is ORed with the 48-bit word on line 730. The output of OR gate 720 is input to multiplexer 310 via line 740. This data word is then selected from multiplexer 310 and stored in the register file 110 via data line 150.

In summary, the load bit-field operation is performed by shifting input word A and LIT, which contains a selection mask, to the target bit field position and then setting each bit of the output word equal to the corresponding bit of either A or B depending on whether the corresponding mask bit is a one or a zero.

Figure 8:
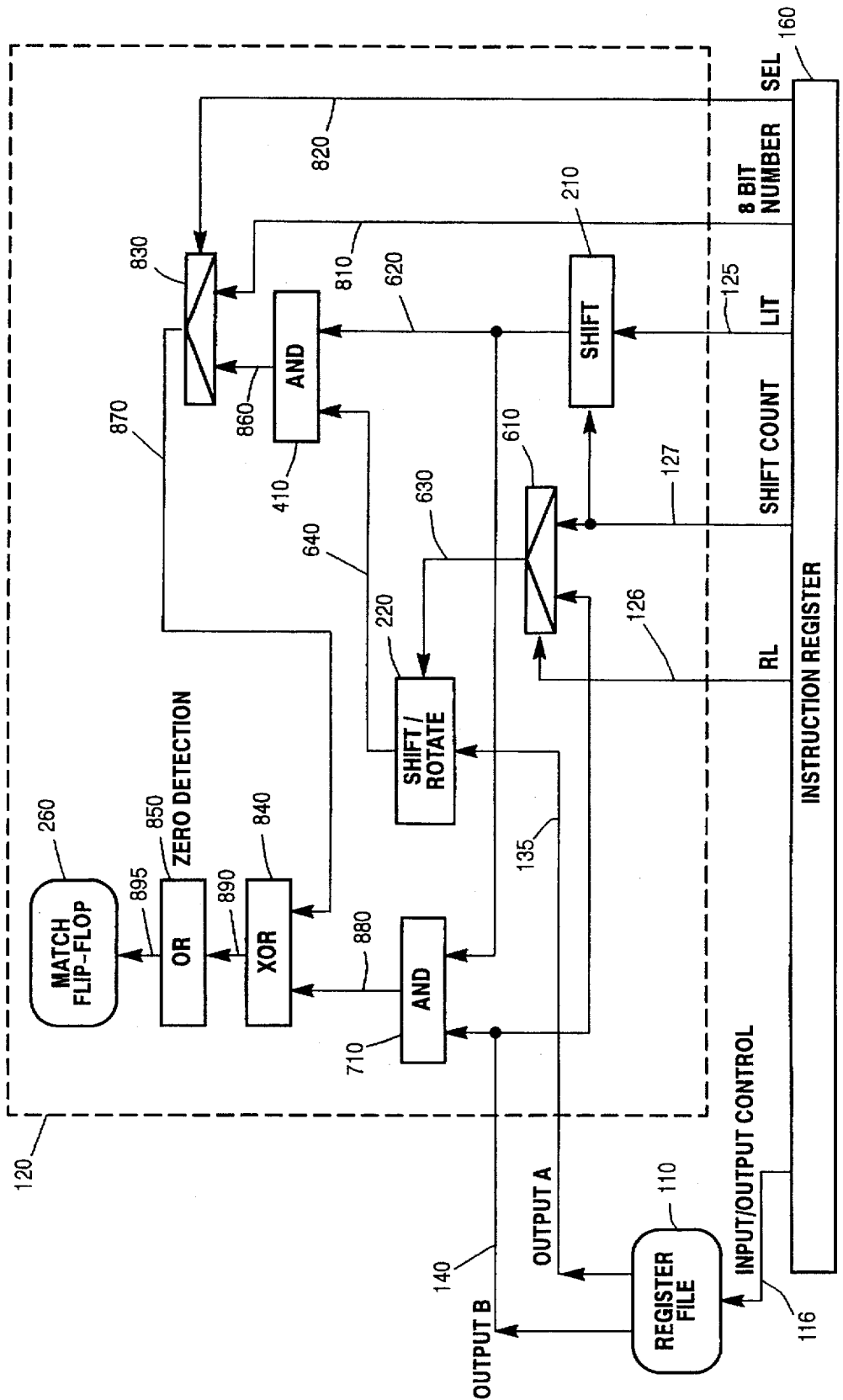
FIG. 8 is a detailed block diagram of the logic used to implement a compare bit-field operation.

FIG. 8 shows exemplary logic to perform the function of a compare bit-field. The logic used to perform the compare bit-field function includes shift functional unit 210, shift/rotate functional unit 220, AND gates 410 and 710, XOR gate 840, OR gate 850, and multiplexers 610 and 830. Unlike other operations performed by BPU 120, the compare bit-field operation does not generate a full size result word. It merely sets or resets the BPU_Match flag 260. Similar to other operations performed by BPU 120, the compare bit-field operation also updates BPU_Equal_Zero flag 270. Since no result word is defined in this case, the content of BPU_Equal_Zero flag 170 becomes undefined after a compare bit-field operation.

Two modes of the compare bit-field operation are supported by a preferred embodiment of the present invention. The first mode of operation compares bits [X:Y] of an input word to bits [(Y−1):Y] of a second input word. The BPU_Match flag 260 is set to true when the contents of the two bit fields are exactly the same. Otherwise, the BPU_Match flag is cleared to zero. In this context, X is a number from 0 to (N−1), where N is the word size defined by the architecture 100. Y is a number from 1 to 18.

The second mode of operation of the compare bit-field compares bits [X:Y] of the first input word with an 8-bit number from the current instruction word. Once again, X is a number from 0 to (N−1), where N is the word size defined by the architecture 100. Y is a number from 1 to 18. If Y is specified to be more than 8 bits wide, the 8-bit number from the instruction word is padded with zeros on the high order bit before the comparison is executed. The BPU_Match flag 260 is set or cleared accordingly.

Regardless of whether the second operand is from the register file or from the current instruction word, only the lowest Y number of bits are being used for the comparison function. Once set or cleared, the BPU_Match flag 260 retains its value until the next compare bit-field operation. The BPU_Match flag 260 is automatically saved and restored during a hardware interrupt.

The compare bit-field operation is done by performing an extract bit-field operation on the first input word, followed by a comparison function to compare the result of the extract bit-field operation with either the second input word or the 8-bit number from the current instruction word stored in the instruction register 160.

The logic for the compare bit-field operation is described in detail below. The first 48-bit input word for this operation is from the A output 135 of the register file 110. The data word from the A output 135 is input to shift/rotate functional unit 220. The shift/rotate functional unit 220 rotates the input word so that bit X becomes bit (Y−1). The shift output from the MSB is used as the shift input to the LSB.

The number of bit positions rotated can once again be specified in two different manners. First, it can be a 6-bit number specified directly in the instruction word stored in instruction register 160. This is specified in the SHIFT COUNT field 127. Second, the number of bit positions rotated can be specified by a 6-bit number from a second register, i.e., the B output 140 of the register file 110. Note, once again, that only the least significant bits from the B output 140 of register file 110 are used as an input to shift/register functional unit 220. The rest of the bits from the B output 140 are ignored.

The control bit RL 126 specifies whether the SHIFT COUNT field 127 or the B output 140 is to be used. Both the SHIFT COUNT field 127 and the B output 140 are input to multiplexer 610. Based on the value of the RL field 126, one of these two inputs are selected from multiplexer 610 and used as a control input to shift/rotate functional unit 220 via line 630. The 48-bit word produced by shift/rotate functional unit 220 is input to AND gate 410 via line 640.

LIT 125 is an 18-bit value from the current instruction word with the high order bits padded with zeroes. LIT 125 is equal to Y. The SHIFT COUNT 127 indicates how many bits LIT 125 should be shifted by shift functional unit 210. Shift functional unit 210 produces a 48-bit word having Y number of ones starting at bit X. This 48-bit word is input to AND gate 410 and AND gate 710 via line 620.

The 48-bit word on line 620 is ANDed with the 48-bit word on line 640 (produced by shift/rotate functional unit 220). The resulting 48-bit data word is input to multiplexer 830 via line 860.

Under a second mode of operation, an 8 bit number 810 from the current instruction word (i.e., the instruction word currently being executed) in instruction register 160 is provided to multiplexer 830. Multiplexer 830 is controlled by a SEL field 820 in the instruction stored in instruction register 160. Thus, the SEL field 820 determines whether BPU 120 operates under the first mode or the second mode of operation. The output from multiplexer 830 is provided to XOR gate 840 via line 870.

The 48-bit word on line 620 is ANDed with the B output 140 of register file 110. The outputs of AND gate 710 is input to XOR gate 840 via line 880. Thus, the input on line 870 is XORed with the input on line 880 to produce a value on bus 890. The value on bus 890 is input to OR gate 850. OR gate 850 performs a logical OR operation on all bits of the input word on bus 890.

A logical zero result at the output of OR gate 850 indicates a match. In an alternate embodiment, OR gate 850 is replaced with a NOR gate (not shown). Thus, in the alternate embodiment, a logical one at the output of the NOR gate indicates a match.

The present invention performs all the bit manipulation operations in a single clock cycle. The compare bit-field operation, as describe above, has the longest propagation delay relative to the other bit manipulation operations performed by BPU 120. As such, an brief explanation of the propagation delay through the critical path of the logic shown in FIG. 8 is provided below.

Figure 10:
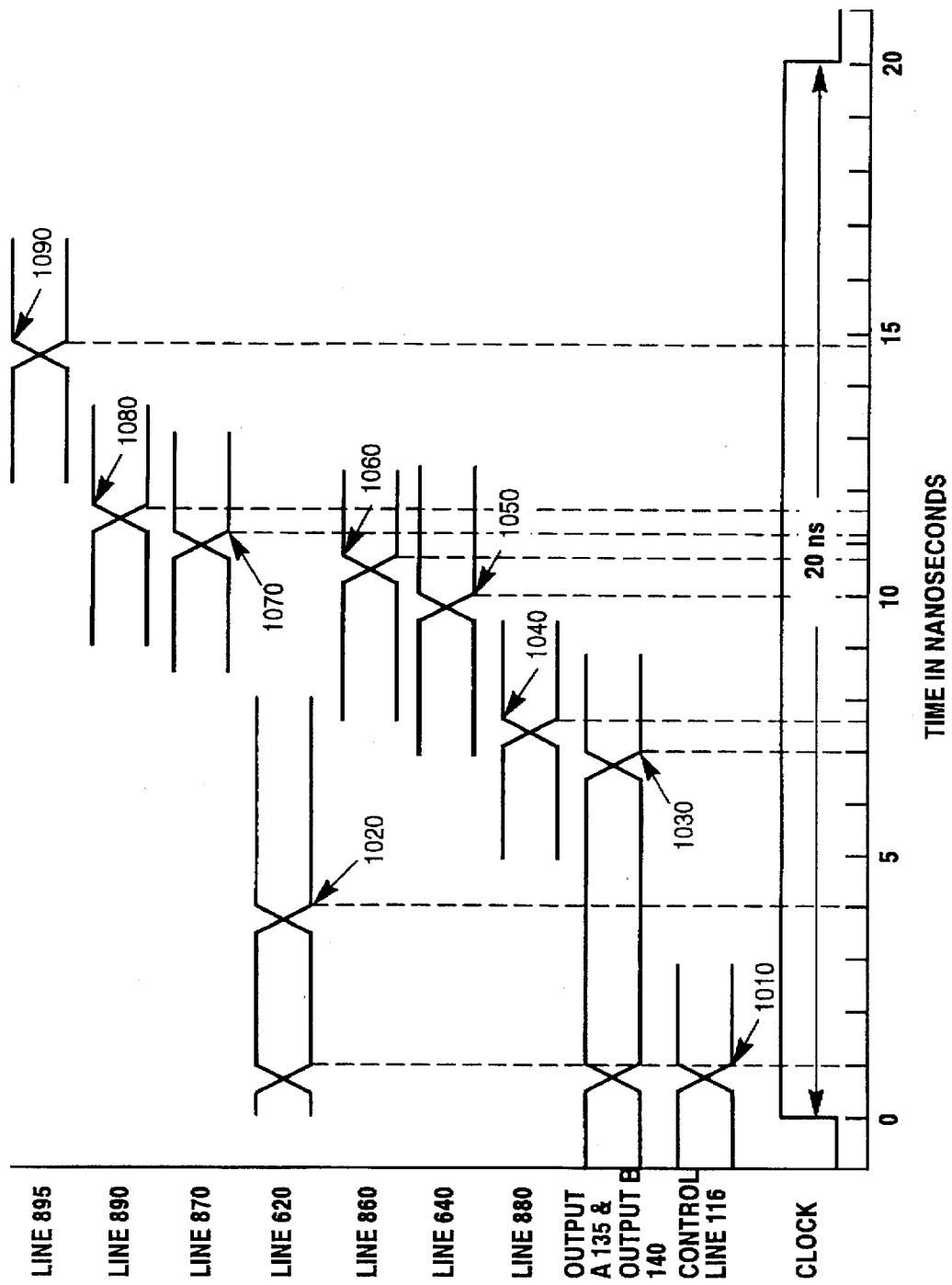
FIG. 10 illustrates the propagation delay of the critical path through the logic shown in FIG. 8.

FIG. 10 illustrates the propagation delay of the critical path through the logic shown in FIG. 8. In a preferred embodiment, a single clock cycle is 20 nanoseconds (ns) and a compare bit-field operation takes 14.8 ns to complete. Generally, the critical path is a path within the logic that requires the longest propagation delay in order to complete the execution of an instruction.

The delays associated with each of the hardware units shown in FIG. 8 are as follows. The instruction register has a propagation delay of 1 ns, i.e, it takes 1 ns to place data on input/output control line 116, RL line 126, SHIFT COUNT 127, LIT 125, etc. Register file 110 has a propagation delay of 6 ns, i.e., it takes 6 ns to place data on output A 135 and/or output B 140. Shift functional unit 210 and Shift/Rotate functional unit 220 have a propagation delay of 3 ns. AND gate 410 and AND gate 710 have a propagation delay of 0.6 ns. Multiplexer 610 has a propagation delay of 1 ns and multiplexer 830 has a propagation delay of 0.5 ns. XOR gate has a propagation delay of 0.7 ns and OR gate 850 has a propagation delay of 3 ns.

Referring to FIG. 10, the critical path to complete the compare bit-field operation includes instruction register 160, register file 110, shift/rotate functional unit 220, AND gate 410, multiplexer 830, XOR gate 840, and OR gate 850. As shown at reference number 1010, data is placed on the input/output control line 116 after 1 ns. After a propagation delay of 6 ns, register file 110 places data on output A 135 and output B 140. This is shown at reference number 1030.

Shift/rotate functional unit requires a propagation delay of 3 ns. Data is thus placed on line 640 after a total of 10 ns, as shown at reference number 1050. After a propagation delay of 0.6 ns for AND gate 410 data is placed on line 860. Data is then place on line 870 after a propagation delay of 0.5 ns for multiplexer 830. This is shown at reference numbers 1060 and 1070, respectively. Line 870 is one of two inputs to XOR gate 840.

The second input to XOR gate 840 is line 880. The propagation delay associated with line 880 is also shown in FIG. 10 (i.e., line 140, line 620, and AND gate 710). However, line 880 is not part of the critical path since data is available on this line after 7.6ns, as shown at reference number 1040; whereas data is available on line 870 after a larger propagation delay of 11.1 ns.

As shown at reference number 1080, data is available on line 890 after an additional propagation delay of 0.7 ns associated with XOR gate 840. OR gate 850 has an associated propagation delay of 3 ns. Accordingly, data is available on line 895 after a total propagation delay of 14.8 ns, as shown at reference number 1090. As shown by this example, the compare bit-field operation has an execution time under one clock cycle (i.e., under 20 ns). It should be readily apparent to those skilled in the art based on this example, that the other operations described herein also have an execution time of under one clock cycle.

Figure 9:
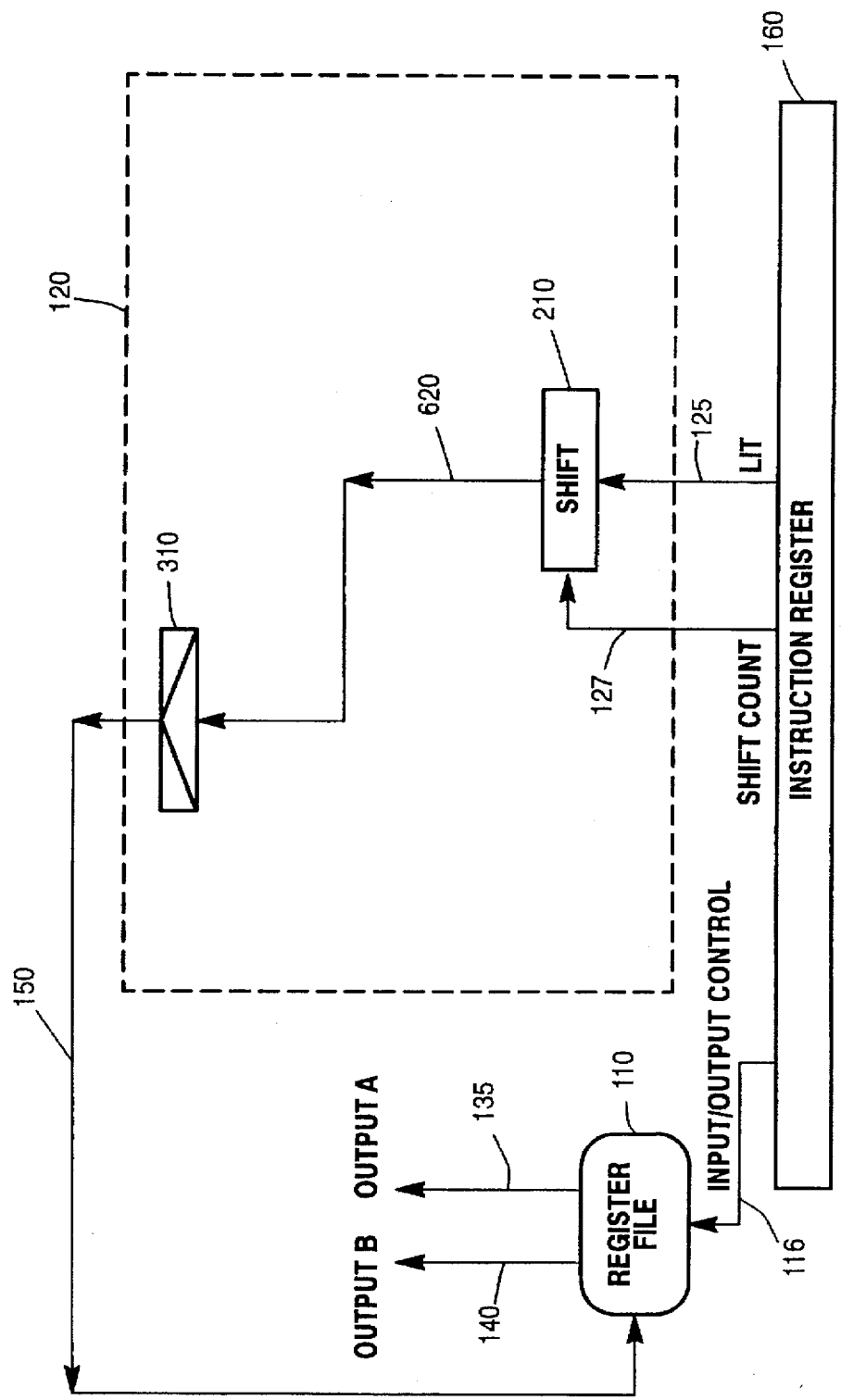
FIG. 9 is a detailed block diagram of the logic used to implement a load literal field.

FIG. 9 shows exemplary logic to perform the function of a load LIT shifted. The logic used to perform this function includes shift functional unit 210 and multiplexer 310. This operation assigns a shifted 18-bit LIT value 125 to a register. The shift function can position the 18-bit LIT value 125 to anywhere within the 48-bit word. Bits outside the target 18-bit field are cleared to zero.

The SHIFT COUNT 127 indicates how many bits LIT 125 should be shifted by shift functional unit 210. Shift functional unit 210 produces a 48-bit word having the LIT value 125 positioned within a word as indicated by SHIFT COUNT 125. The resulting data word is input to multiplexer 310. This data word is then selected from multiplexer 310 and stored in the register file 110 via data line 150.

Conventional microprocessors perform bit processing within the ALU 130, which is highly inefficient since these operations typically take between three to four clock cycles to complete. The microprocessor architecture described herein performs the bit manipulation operations described above in a single clock cycle. This gives the present invention a tremendous advantage over conventional microprocessors, which typically require three to four clock cycles to perform the identical operations.

The majority of the operations performed by BPU 120 utilize the same gates. For example, the same shift register is used in all operations requiring shifting. This resource sharing of logic enables BPU 120 to be implemented using relatively few gates. Inspection of typical microcode routines indicate that 60-70 percent of the processor time is used to perform bit manipulation operations. Consequently, BPU 120 is no larger than ALU 130, but produces on average three times the performance over conventional microprocessors.

Furthermore, BPU 120 allows a microprocessor to schedule the execution of instructions in a more efficient manner. Thus, the microprocessor does not need to stall while more complex, time consuming arithmetic operations are executed. The present invention allows logical operations to be executed in parallel or out-of-order relative to arithmetic operations. Thus, the present invention provides a microprocessor system that accommodates or otherwise avoids stalling between an arithmetic operation and a logical operation.

While the invention has been particularly shown and described with reference to preferred embodiments thereof, it will be understood by those skilled in the art that various changes in form and details may be made therein without departing from the spirit and scope of the invention.

What is claimed is:

1. A microprocessor for executing instructions within an instruction stream, comprising:
   an instruction register that functions as a queue for instructions before execution;
   a register file having a plurality of general purpose registers;
   an arithmetic logic unit, connected to said register file and said instruction register, that executes said instructions having arithmetic operations; and
   a bit processing unit, connected to said register file and said instruction register, said bit processing unit having a shift functional unit, a shift/rotate functional unit, and a merge functional unit that contain digital logic for performing a Boolean operation, configured to execute said instructions having complex logical operations within a single clock cycle.

2. The system of claim 1, wherein said bit processing unit has at least three inputs originating from said instruction register including a shift count field input, a literal field input, and a control field input.

3. The system of claim 1, wherein said bit processing unit includes a match flag that is updated by a compare bit operation and a zero flag that is set when said bit processing unit produces a result that is equal to zero.

4. The system of claim 1, wherein said shift functional unit having a first input connected to a literal field input representing a literal field of an instruction stored in said instruction register and a second input connected to a shift count input representing a shift count field of said instruction stored in said instruction register, and an output, said output representing the result of "a load literal field" operation that stores a value stored in said literal field of said instruction to a target field within a word, wherein bits outside said target field are cleared to zero.

5. The system of claim 1, wherein said specified number is contained in said instruction register.

6. The system of claim 1, wherein said specified number is contained in said register file.

7. The system of claim 1, wherein arithmetic operations performed by said arithmetic logic unit and logical operations performed by said bit processing unit are executed in parallel.

8. A microprocessor for executing instructions within an instruction steam, comprising:

instructions register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, configured to execute said instructions having complex logical operations within a single clock cycle, wherein said bit processing unit includes:

a shift functional unit having a first input and a second input connected to said instruction register and an output, and a NOT gate having an input connected to said output of said shift functional unit and an output, and an AND gate having a first input connected to said output of said NOT gate, a second input connected to said register file representing an input word, and an output, said output representing the result of a clear-bit field operation that resets specified bits of said input word to zero and leaves all other bits of said input word intact.

9. The system of claim 8, wherein said specified bits are determined based on a value contained in said instruction register.

10. The system of claim 8, wherein arithmetic operations performed by said arithmetic logic unit and logical operations performed by said bit processing unit are executed in parallel.

11. A microprocessor for executing instructions with an instruction stream, comprising:

an instruction register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, configured to execute said instructions having complex logical operations within a single clock cycle, wherein said bit processing unit includes:

a shift functional unit having a first input and a second input connected to said instruction register and an output, and an AND gate having a first input connected to said output of said shift functional unit, a second input connected to said register file representing an input word, and an output, said output representing the result of "an isolate bit-field" operation that resets all bits of said input word except specified bits of said input word.

12. The system of claim 11, wherein said specified bits are determined based on a value contained in said instruction register.

13. The system of claim 11, wherein arithmetic operations performed by said arithmetic logic unit and logical operations performed by said bit processing unit are executed in parallel.

14. A microprocessor for executing instructions within an instruction stream, comprising:

an instruction register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, configured to execute said instructions having complex logical operations within a single clock cycle, wherein said bit processing unit includes:

a shift functional unit having a first input and a second input connected to said instruction register and an output, said first input representing a first input word, a multiplexer having a first input connected to said register file, a second input and a control input connected to said instruction register, and an output, a shift/rotate functional unit having a first input connected to said register file representing a second input word, a control input connected to said output of said multiplexer and an output, a first AND gate having a first input connected to said output of said shift functional unit, a second input connected to said output of said shift/rotate functional unit, and an output, a second AND gate having a first input connected to said register file, a second input connected to said output of said shift functional unit, and an output, and an OR gate having a first input connected to said output of said first AND gate, a second input connected to said output of said second AND gate, and an output, said output representing the result of "a load bit-field" operation that replaces specified bits of said second input word with corresponding bits of said first input word, wherein all other bits of said output are copied from said second input word.

15. The system of claim 14, wherein said specified bits of said second input word are determined based on a number contained in said instruction register.

16. The system of claim 14, wherein said specified bits of said second input word are determined based on a number contained in said register file.

17. The system of claim 14, wherein arithmetic operations performed by said arithmetic logic unit and logical operations performed by said bit processing unit are executed in parallel.

18. A microprocessor for executing instructions within an instruction stream, comprising:

an instruction register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, configured to execute said instructions having complex logical operations within a single clock cycle, wherein said bit processing unit includes:

a multiplexer having a first input connected to said register file, a second input connected to said instruction register, a control input connected to said instruction register, and an output, and a shift/rotate functional unit having a first input connected to said register file, a second input connected to said output of said multiplexer, and an output, said output representing a result of a shift and rotate operation that shifts or rotates said first input of said shift/rotate functional unit a specified number of bit positions toward the most significant bit of said first input.

19. The system of claim 18, where said specified number is contained in said instruction register.

20. The system of claim 18, wherein said specified number is contained in said register file.

21. The system of claim 18, wherein arithmetic operations performed by said arithmetic logic unit and logical operations performed by said bit processing unit are executed in parallel.

22. A microprocessor for executing instructions within an instruction stream, comprising:
   an instruction register that functions as a queue for instructions before executing;
   a register file having a plurality of general purpose registers;
   an arithmetic logic unit, connected to said register file and said instruction register, that executes said instructions having arithmetic operations; and
   a bit processing unit, connected to said register file and said instruction register, configured to execute said instructions having complex logical operations within a single clock cycle, wherein said bit processing unit includes:
      a shift functional unit having a first input and a second input connected to said instruction register and an output,
      a multiplexer having a first input connected to said register file, a second input and a control input connected to said instruction register, and an output,
      a shift/rotate functional unit having a first input connected to said register file representing an input word, a control input connected to said output of said multiplexer and an output, and
      an AND gate having a first input connected to said output of said shift functional unit, a second input connected to said output of said shift/rotate functional unit, and an output, said output representing the result of "an extract bit-field" operation that moves specified bits of said input word within said input word and resets all other bits of said input word to zero.

23. The system of claim 22, wherein said specified bits are determined based on a number contained in said instruction register.

24. The system of claim 22, wherein said specified bits are determined based on a number contained in said register file.

25. The system of claim 22, wherein arithmetic operations performed by said arithmetic logic unit and logical operations performed by said bit processing unit are executed parallel.

26. A microprocessor for executing instructions within an instruction stream, comprising:
   an instruction register that functions as queue for instructions before execution;
   a register file having a plurality of general purpose registers;
   an arithmetic logic unit, connected to said register file and said instruction register, that executes said instructions having arithmetic operations; and
   a bit processing unit, connected to said register file and said instruction register, configured to execute said instructions having complex logical operations within a single clock cycle, wherein said bit processing unit includes:
      a shift functional unit having a first input and a second input connected to said instruction register and an output,
      a first multiplexer having a first input connected to said register file, a second input and a control input connected to said instruction register, and an output,
      a shift/rotate functional unit having a first input connected to said register file representing an input word, a control input connected to said output of said first multiplexer and an output,
      a first AND gate having a first input connected to said output of said shift functional unit, a second input connected to said output of said shift/rotate functional unit, and an output,
      a second multiplexer having a first input connected to said output of said first AND gate, a second input and third input connected to said instruction register, and an output,
      a second AND gate having a first input connected to said register file, a second input connected to said output of said shift functional unit, and an output,
      an XOR gate having a first input connected to said output of said second multiplexer, a second input connected to said output of said second AND gate, and an output, and
      an OR gate having an input connected to said output of said XOR gate and an output, said output representing the result of "a compare bit-field" operation that sets a match flag register.

27. The system of claim 26, wherein arithmetic operations performed by said arithmetic logic unit and logical operations performed by said bit processing unit are executed in parallel.

28. A microprocessor for executing instructions within an instruction stream, comprising:
   an instruction register that functions as a queue for instructions before execution;
   a register file having a plurality of general purpose registers;
   an arithmetic logic unit, connected to said register file and said instruction register, that executes said instructions having arithmetic operations; and
   a bit processing unit, connected to said register file and said instruction register, said bit processing unit having a shift functional unit, a shift/rotate functional unit, and a merge functional unit that contain digital logic for performing a Boolean operation, configured to execute said instructions having complex logical operations within a single clock cycle, wherein said bit processing unit includes means for performing a clear bit-field operation that resets specified bits of an input word to zero and leaves all other bits of said input word intact.

29. The system of claim 28, wherein said specified bits are determined based on a value contained in said instruction register.

30. The system of claim 28, wherein arithmetic operations performed by said arithmetic logic unit and logical operations performed by said bit processing unit are executed in parallel.

31. A microprocessor for executing instructions within an instruction stream, comprising:
   an instruction register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, said bit processing unit having a shift functional unit, a shift/rotate functional unit, and a merge functional unit that contain digital logic for performing a Boolean operation, configured to execute said instructions having complex logical operations within a single clock cycle, wherein said bit processing unit includes means for performing an isolate bit-field operation.

32. The system of claim 31, wherein arithmetic operations performed by said arithmetic logic unit and logical operations performed by said bit processing unit are executed in parallel.

33. A microprocessor for executing instructions within an instruction stream, comprising:

an instruction register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, said bit processing unit having a shift functional unit, a shift/rotate functional unit, and a merge functional unit that contain digital logic for performing a Boolean operation, configured to execute said instructions having complex logical operations within a single clock cycle, wherein said bit processing unit includes means for performing an extract bit-field operation that moves specified bits of an input word within said input word and resets all other bits of said input word to zero.

34. The system of claim 33, wherein said specified bits are determined based on a number contained in said instruction register.

35. The system of claim 33, wherein said specified bits are determined based on a number contained in said register file.

36. The system of claim 33, wherein arithmetic operations performed by said arithmetic logic unit and logical operations performed by said bit processing unit are executed in parallel.

37. A microprocessor for executing instructions within an instruction stream, comprising:

an instruction register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, said bit processing unit having a shift functional unit, a shift/rotate functional unit, and a merge functional unit that contain digital logic for performing a Boolean operation, configured to execute said instructions having complex logical operations within a single clock cycle, wherein said bit processing unit includes means for performing a load bit-field operation.

38. The system of claim 37, wherein arithmetic operations performed by said arithmetic logic unit and logical operations performed by said bit processing unit are executed in parallel.

39. A microprocessor for executing instructions within an instruction stream, comprising:

an instruction register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, said bit processing unit having a shift functional unit, a shift/rotate functional unit, and a merge functional unit that contain digital logic for performing a Boolean operation, configured to execute said instructions having complex logical operations within a single clock cycle, wherein said bit processing unit includes means for performing a compare bit-field operation.

40. The system of claim 39, wherein arithmetic operations performed by said arithmetic logic unit and logical operations performed by said bit processing unit are executed in parallel.

41. A microprocessor for executing instructions within an instruction stream, comprising:

an instruction register that functions as a queue for instructions before execution;

a register file having a plurality of general purpose registers;

an arithmetic logic unit, connected to said register file and said instruction register, that executes said instructions having arithmetic operations; and a bit processing unit, connected to said register file and said instruction register, said bit processing unit having a shift functional unit, a shift/rotate functional unit, and a merge functional unit that contain digital logic for performing a Boolean operation, configured to execute said instructions having complex logical operations within a single clock cycle, wherein said bit processing unit includes means for performing a load literal field operation that stores a value stored in a literal field of an instruction to a target field within a word, wherein bits outside said target field are cleared to zero.

* * * * *